United States Patent [19]

Sawamura

[11] Patent Number: 5,641,943
[45] Date of Patent: Jun. 24, 1997

[54] METHOD AND APPARATUS FOR CONNECTING ELECTRIC WIRES TO EACH OTHER

[75] Inventor: Naohito Sawamura, Yokkaichi, Japan

[73] Assignee: Sumitomo Wiring Systems, Ltd., Mie, Japan

[21] Appl. No.: 289,201

[22] Filed: Aug. 12, 1994

[30] Foreign Application Priority Data

Sep. 29, 1993 [JP] Japan .................................. 5-268025

[51] Int. Cl.$^6$ ................................................ H02G 15/04
[52] U.S. Cl. ........................ 174/74 A; 174/74 R; 174/76
[58] Field of Search ........................ 174/87, 74 R, 174/74 A, 76, 84 R; 29/868, 872

[56] References Cited

U.S. PATENT DOCUMENTS

| | | | |
|---|---|---|---|
| 3,083,260 | 3/1963 | Bird | 174/87 |
| 3,523,607 | 8/1970 | Gillemot et al. | |
| 3,550,765 | 12/1970 | Anderson | 174/87 |
| 3,585,275 | 6/1971 | Gillemot et al. | 174/76 |
| 3,597,528 | 8/1971 | Penfield et al. | 174/87 |
| 3,742,123 | 6/1973 | Haub, Jr. | 174/138 F |
| 3,937,870 | 2/1976 | Bumpstead et al. | 174/87 |
| 3,985,951 | 10/1976 | Harris | 174/138 F |
| 4,098,663 | 7/1978 | Baboian | 174/74 R |
| 4,647,717 | 3/1987 | Uken | 174/84 C |
| 4,721,832 | 1/1988 | Toy | 174/87 |
| 4,839,473 | 6/1989 | Fox et al. | 174/138 F |
| 5,113,037 | 5/1992 | King, Jr. et al. | 174/87 |
| 5,140,746 | 8/1992 | Debbaut | 29/855 |
| 5,308,922 | 5/1994 | Wallace et al. | 174/87 |
| 5,315,066 | 5/1994 | Spiteri, Sr. | 174/87 |

FOREIGN PATENT DOCUMENTS

| | | | |
|---|---|---|---|
| 0432662 | 6/1991 | European Pat. Off. . | |
| 3113876 | 10/1982 | Germany | 174/74 A |
| 63-157163 | 10/1988 | Japan . | |
| 4-33287 | 2/1992 | Japan . | |
| 1227584 | 4/1971 | United Kingdom | 174/87 |
| 1303581 | 1/1973 | United Kingdom . | |
| 92/22105 | 12/1992 | WIPO . | |

Primary Examiner—Kristine L. Kincaid
Assistant Examiner—Marc D. Machtinger
Attorney, Agent, or Firm—Oliff & Berridge

[57] ABSTRACT

An apparatus and method for connecting the end portions of electric wires to each other prevents the generation of a respiratory action in the connected end portions of the electric wires and thereby improves connection quality and connection working performance, and reduces the size of the connected portions. Insulating coatings of the end portions of electric wires are removed to provide exposed conductors. The exposed conductors are collected and integrated into a collective conductor and a tapered insulating cap having an opening at one of its ends is fitted over the collective conductor with portions of the insulating coatings adjoining the collective conductor. Waterproof agents are injected into and filled within the insulating cap, the peripheral edges of the opening of the insulating cap are welded and fixed to the insulating coatings to thereby close the opening hermetically, and the end portions of the electric wires including the collective conductor embedded in the waterproof agents are stored and hermetically sealed in the insulating cap.

12 Claims, 3 Drawing Sheets

METHOD AND APPARATUS FOR CONNECTING ELECTRIC WIRES TO EACH OTHER

BACKGROUND OF THE INVENTION

The present invention relates to a method and apparatus for connecting electric wires mutually and conductively, the electric wires being arranged in parallel to each other in a wire harness or the like.

As a conventional method of connecting the end portions of electric wires to each other, there are available well-known methods that are disclosed in Japanese Patent Publication No. 4-33287 and Japanese Utility Model Publication No. 63-157163. In one of the well-known methods, as shown in FIG. 6, the insulating coatings 4 of electric wires 1 to be connected are removed to provide exposed conductors, and the exposed conductors are collected to provide a collective conductor 3. The end portions of the electric wires 1 including the collective conductor 3 are covered with an insulating tube 12. While the insulating coatings 4 of the electric wires 1 are inserted into and held by one of two openings formed in the two end portions of the insulating tube 12, the insulating coatings 4 are welded to the end portion of the insulating tube 12 to close the connecting portions.

In another conventional method, as shown in FIG. 7, the end portions of the electric wires 1 including the collective conductor 3, similarly formed by collecting the exposed conductors, are inserted between and held by two upper and lower insulating sheets 13, and the peripheral edges of the insulating sheets 13 are welded together.

In both of the conventional connecting methods, the connecting portions of the electric wires wrapped in the insulating tube 12 or sheet 13 are shut off from the open air to stop respiratory action of the electric wires. Respiratory action is an action in which the air is ventilated from one end of an electric wire to the other through gaps across the wire due to the expansion and contraction of the air caused by the varying temperatures of a connector of the end portion of the electric wire or the like. Wrapping of the wires in this manner prevents water from entering from the connected end portions of the electric wires.

In the above-mentioned well-known methods, however, because air is trapped within the insulating tube 12 or sheet 13 during the welding process, the air can be condensed into dew according to the temperatures of the connecting portion of the insulation tube or sheet, with the result that the connecting portion can rust and a slight respiratory action can be produced in the connected wires. In addition, because the insulating tube 12 and the sheet 13 include a plurality of peripheral edges to be welded, and there is a danger that the open air can be ventilated due to the poorly welded edges and high quality connected wires are hard to obtain. In addition, a plurality of points must be checked to prevent the poor welding, which results in complicated working management.

Further, in the above well-known connecting methods, because a plurality of peripheral edges of the insulating tube 12 or sheet 13 must be welded, a large-size welding mold is required and the weld working is complicated. Besides, in welding, it is difficult to position the collective conductor 3 with respect to the insulating tube 12 or the like, which requires much labor and time for welding and thus the costs of the connected wires are expensive. In addition, the insulating tube 12 or sheet 13 must be fairly larger in size than the collective conductor 3 to be wrapped therein and thus the insulating tube 12 or sheet 13 provides a dead zone. This inevitably causes the connecting end portion of the insulating tube with the collective conductor to become large in size. However, such large-size connecting end portion is contrary to the demands for reduction of the size of the wire harness system, which should be as compact as possible.

SUMMARY OF THE INVENTION

In order to solve the technical problems found in the conventional methods, according to a first aspect of the present invention, there is provided a method of connecting wires having end portions arranged in parallel to each other. The method comprises the steps of removing the insulating coatings on end portions of the electric wires to provide exposed conductors, collecting the exposed conductors together to form a collective conductor, fitting an insulating cap having an opening over the collective conductor and the remaining portions of the insulating coatings that adjoin the collective conductor, injecting a waterproof agent into the opening of the insulating cap, welding and fixing the insulating cap to the remaining portions of the insulating coatings of the electric wires, and storing the exposed conductors in the waterproof agent in the insulating cap for protection. In addition, the insulating cap is a tapered insulating cap. The insulating cap is welded and secured to the insulating coatings of the electric wires to such a degree that it is prevented from being removed from the end portions of the electric wires.

According to a second aspect of the present invention, there is provided a connector for connecting a plurality of wires having first portions including exposed conductors and second portions including wire insulators. The connector comprises an insulating cap having a first end and a second end, said first end having an opening and said second end being closed, wherein said first portions of said plurality of wires are disposed within said insulating cap and toward said second end and at least one of said second portions of the wires is fixed to the first end of the insulating cap.

In accordance with yet another aspect of the present invention, there is provided a connector for connecting wires having exposed conductors and wire insulators, comprising an insulating cap having a first open end and a second closed end, and means for waterproofing and preventing respiratory action and rust among the exposed conductors.

In accordance with the invention, due to the fact that the insulating cap is fitted over the collective conductor formed by collecting together the conductors of the electric wires to be connected to each other, the waterproof agents are filled between the insulating cap and the collective conductor. In addition, the end portions including the collective conductor (including the mutually connected conductors) are embedded and stored in the waterproof agents within the insulating cap, so no air remains in the peripheries of the stored collective conductor and thus no respiratory action can be generated in the mutually connected electric wires. Also, because the collective conductor is protected while it is embedded in the waterproof agent, there is no possibility that the collective conductor can be in contact with water and air existing externally of the cap, which can reliably waterproof the mutually connected portions of the electric wires and thus can provide a good and stable connection performance.

Furthermore, because the welding of the insulating cap to the insulating coatings of the electric wires requires only such a degree that the insulating cap is prevented from coming off, the welding operation is simple and easy, check points for welding confirmation can be set simply, and the collective conductor can be easily positioned in the insulating cap. Thus, the working of the connecting portions can be simplified over the above-mentioned conventional methods. Further, because the insulating cap only has to include a hollow portion having such a space that can store therein the collective conductor and the insulating coatings adjoining the collective conductor and allow the waterproof agents to be filled up, the insulating cap omits wasteful space. Thus the mutually connected portions of the electric wires can be further reduced in size when compared with the above-mentioned conventional connecting methods using the insulating tube or the like.

BRIEF DESCRIPTION OF THE DRAWINGS

The invention will be described in detail with reference to the following drawings wherein:

FIGS. 1(A)–1(D) are sequential steps of the connecting process and procedure of the first embodiment;

FIG. 4(A) is a perspective view of an insulating cap used in the third embodiment; and FIG. 4(B) is a transverse section view of the end portions of the electric wires covered with the insulating cap;

DETAILED DESCRIPTION OF PREFERRED EMBODIMENTS

Figure 1A:
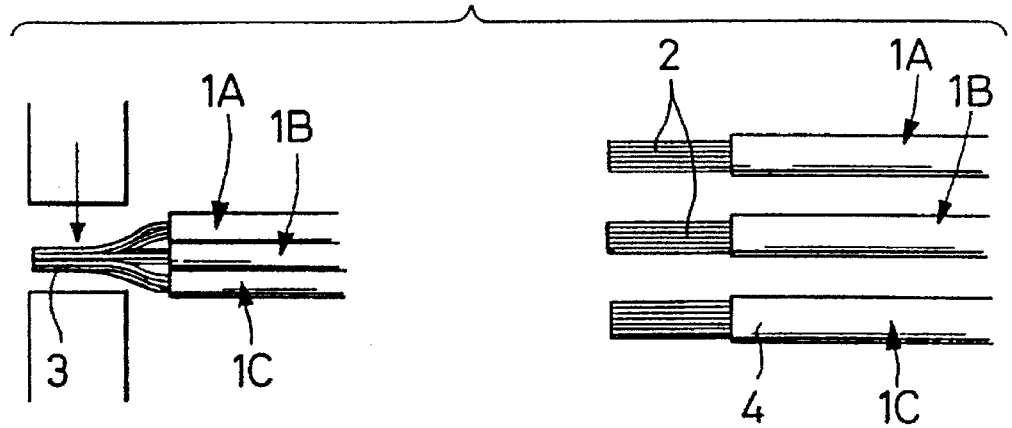
FIGS. 1(A), 1(B), 1(C) and 1(D) are explanatory views of a first embodiment of a method of connecting electric wires to each other according to the invention.
Figure 1B:
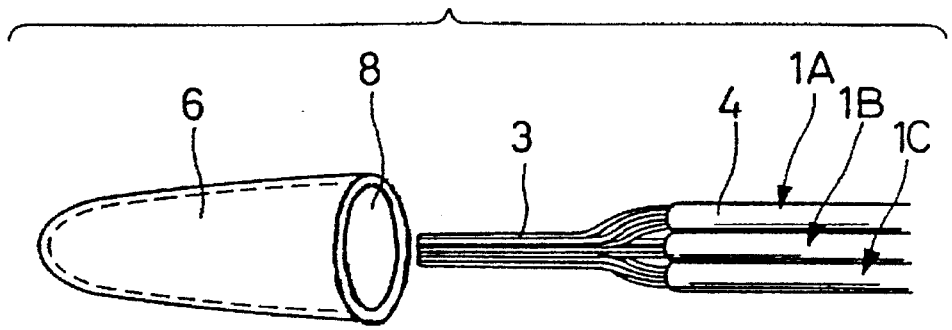
Figure 1C:
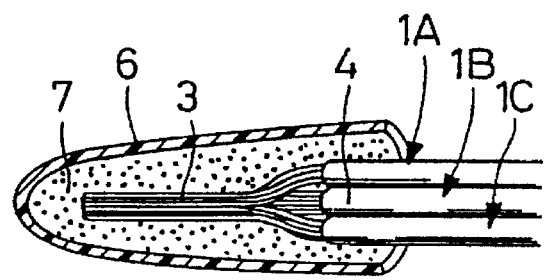
Figure 1D:
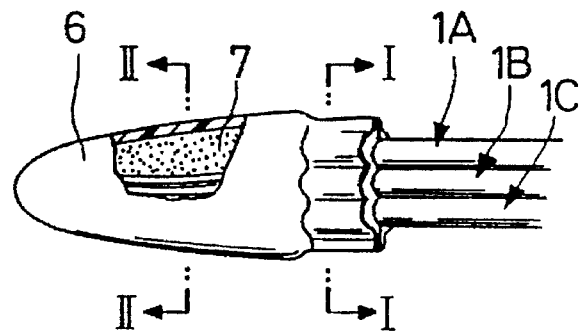
Figure 2A:
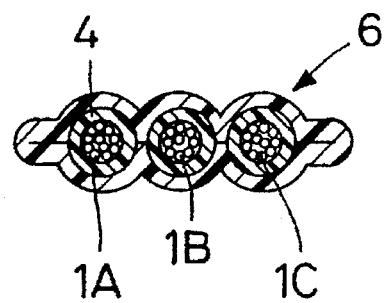
FIG. 2(A) is a section view taken along the line I—I in FIG. 1(D) nd
Figure 2B:
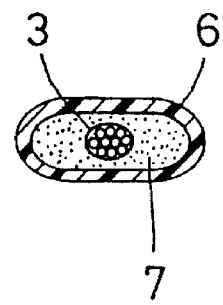
FIG. 2(B) is a section view taken along the line II—II in FIG. 1(D)

FIGS. 1(A)–(D) show the sequence of a first embodiment of a method of connecting electric wires to each other according to the invention. In FIGS. 1(A)–(D), in connecting three electric wires 1A, 1B and 1C, the respective leading end portions of which are arranged in parallel to each other, and the insulating coatings 4 of the respective electric wires are removed from the electric wires. With the respective conductors 2 of the electric wires each having a small exposed length, the three conductors 2 are worked by supersonic welding form a collective conductor 3. Then, a tapered insulating cap 6 formed of resin and having an opening 8 only in one end portion is fitted over the end portions of the electric wires 1A, 1B and 1C including the collective conductor 3 and the electric wires end portions adjoining the collective conductor 3. Waterproof agents 7 such as a hot-melt silicone or the like are injected into and filled within the insulating cap 6. As shown in FIGS. 1(D), 2(A) and 2(B), the opening 8 of the insulating cap 6 is closed and the superimposed upper and lower peripheral edges of the opening 8 as well as the edge portions of the opening 8 and the insulating coatings 4 in contact with each other are welded together so that they are hermetically sealed. That is, the electric wires end portions including the collective conductor 3 are embedded in the waterproof agent 7 and are then sealed into the insulating cap 6, thereby providing the mutually connected portions of the electric wires.

With this construction and process, respiratory actions of the electric wires 1A, 1B and 1C are prevented. At the same time, because the collective conductor 3 is protected by the waterproof agents 7, there is no possibility that the connected end portions thereof can rust, and the quality of the mutually connected portions of the electric wires can be maintained. In addition, because the insulating cap 6 is fitted over the collective conductor 3, the collective conductor 3 can be easily positioned with respect to the insulating cap 6. Only the opening 8 must be welded, so the welding can be simplified and the welding quality can be confirmed with ease.

When compared with the conventional connecting methods using the insulating tube 12 or insulating sheet 13, the size of the mutually connected portions of the electric wires can be vastly reduced because the present embodiment uses the tapered insulating cap 6, which uses less space. In addition, according to the embodiment shown in FIGS. 1(A)–(D), because the opening 8 is closed and sealed, even if the insulating cap 6 with the waterproof agents 7 filled therein is pressed by an external force, the waterproof agent 7 is prevented from escaping from the insulating cap 8, which stabilizes further the waterproof protection of the connected portions.

Other embodiments of a method of connecting electric wires to each other according to the invention are described with reference to FIGS. 3, 4(A), 4(B) and 5. In a second embodiment shown in FIG. 3, after the waterproof agent 7 is filled up in the insulating cap 6, the insulating cap 6 is fixed in such a manner that only the portion thereof in contact with the insulating coating 4 of the electric wire 1B is welded, and the opening 8 is opened in such a manner that it is not welded to the electric wires 1A and 1C. Also, in a third embodiment shown in FIGS. 4(A) and 4(B), there is used an insulating cap 6 that includes a securing piece 9 extending backwardly from the lower edge central portion of the peripheral edges of the opening 8. In the third embodiment, after the collective conductor 3 is inserted and the waterproof agents 7 are filled up in the insulating cap 6, the securing piece 9 is welded to the insulating coating 4 of the intermediate electric wire while the opening 8 is left open.

Figure 3:
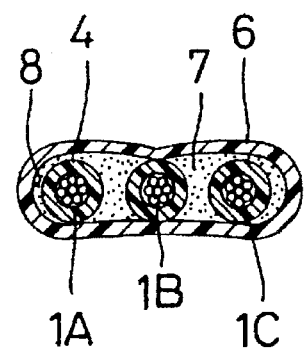
FIG. 3 is a transverse section view of an opening portion of an insulating cap according to a second embodiment of the invention.
Figure 4A:
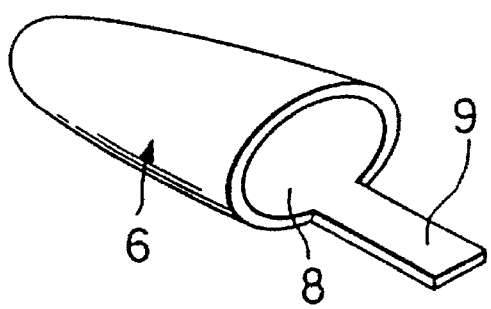
FIGS. 4(A) and 4(B) are views of a third embodiment of the invention.
Figure 4B:
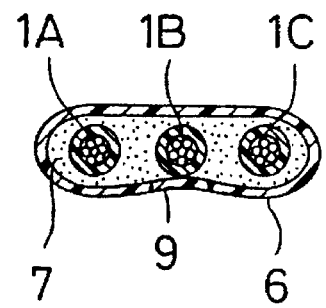

In the embodiments respectively shown in FIGS. 3 and 4(A) and 4(B) as well, because the end portions of the electric wires including the collective conductor 3 are embedded in the waterproof agent 7 within the insulating cap 6 fitted over the wires end portions, the same operation as in the first embodiment can be provided. And, because the insulating cap 6 must be welded only at one point, that is, because the welding can be simplified, the mutually connecting working of the electric wires can be further simplified with higher efficiency.

Figure 5:
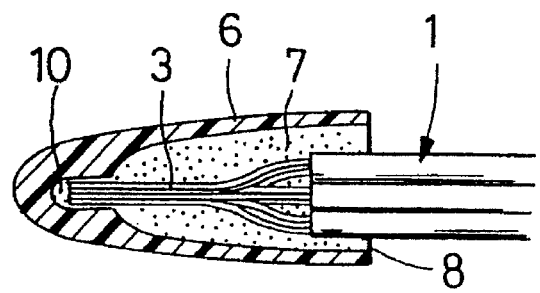
FIG. 5 is a longitudinal section view of the end portions of electric wires covered with an insulating cap used in a fourth embodiment of the invention.
Figure 6:
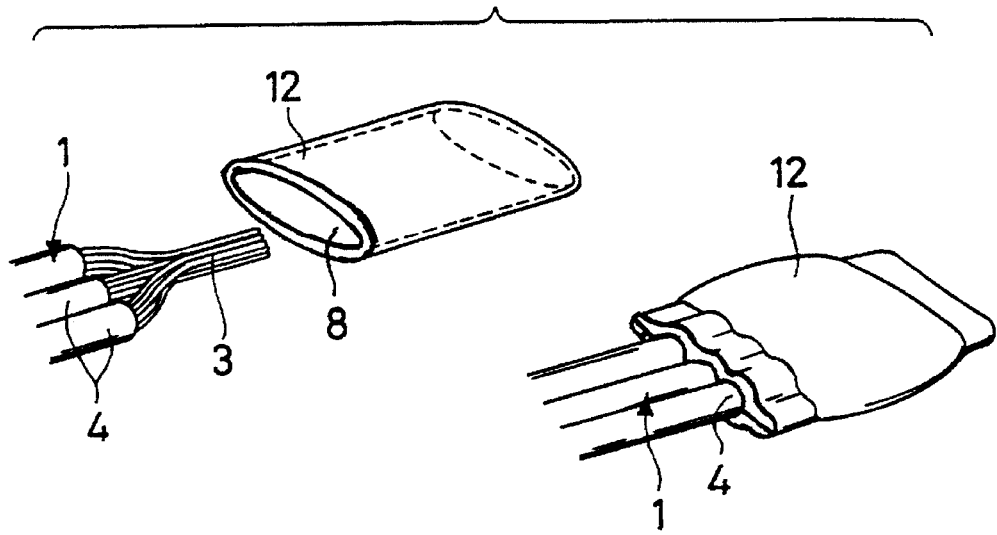
FIG. 6 is an explanatory view of a conventional method or connecting electric wires to each other.
Figure 7:
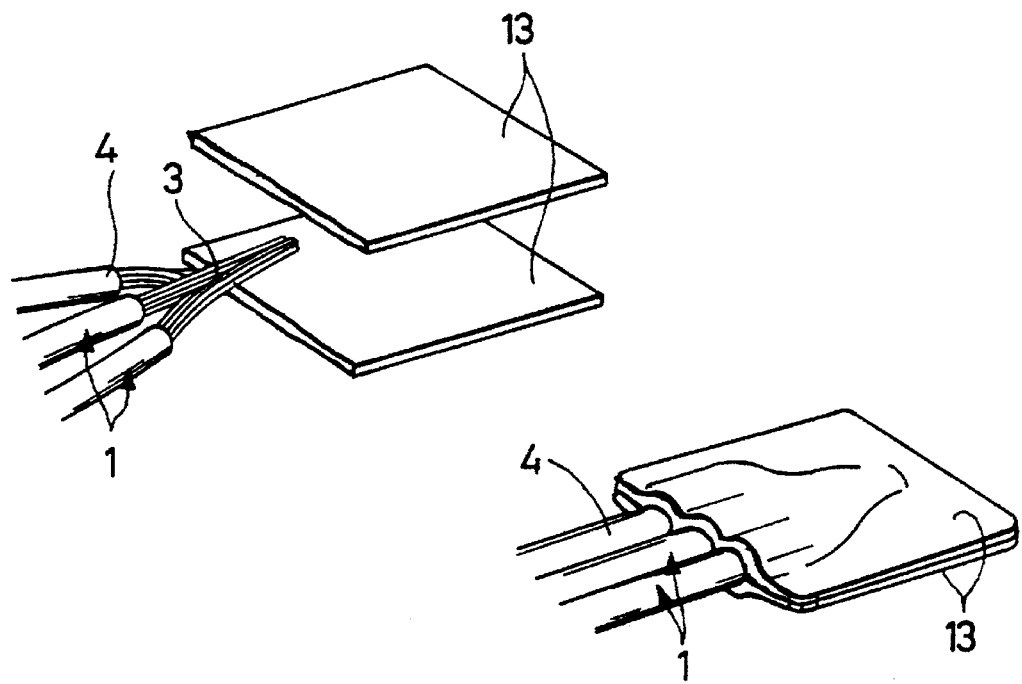
FIG. 7 is an explanatory view of another conventional method of connecting electric wires to each other.

FIG. 5 shows yet another embodiment of the invention. In this embodiment, in the inside of the front end of the insulating cap 6, there is formed a conductor pocket 10 in which the leading end portion of the collective conductor 3 can be held. This makes it very easy to hold the electric wire 1 when the insulating cap 6 is welded.

In the preferred embodiments, the waterproof agents are injected before the insulating cap is fixed to the insulating coatings of the wires. However, the insulating coating could be fixed to at least one insulating coating of at least one wire before the waterproof agents are injected provided a gap is provided between the insulating cap and the other insulating coatings of the other wires.

As has been described, the method and apparatus for connecting electric wires to each other according to the invention prevents the connected end portions of the electric wires from generating a respiratory action and the connected conductors from rusting to provide an excellent electric wire connection performance. Also, the present connecting method has a good connecting workability and facilitates the management of the process for electric wire connecting working to thereby reduce the costs for connection of the electric wires. Further, the present connecting method renders the shape of the connected portions of the electric wires small-sized and compact to thereby meet the demand for a compact wire harness and the like.

The invention has been described in detail with reference to preferred embodiments thereof, which are intended to be illustrative but not limiting. Various changes may be made without departing from the spirit and scope of the invention as set forth in the appended claims.

What is claimed is:

1. A method for connecting wires having end portions arranged in parallel to each other, said method comprising the steps of:

removing insulating coatings from end portions of insulated wires to expose conductors;

collecting said exposed conductors together to form a collective conductor;

fitting an insulating cap having an opening at one end over said collective conductor and remaining portions of said insulating coatings adjoining said collective conductor;

inserting the collective conductor into a conductor pocket located at a closed end of the insulating cap;

injecting a waterproof agent into said opening of said insulating cap;

welding and fixing said insulating cap to at least one remaining portion of at least one of said insulating coatings;

storing said exposed conductors in said waterproof agent in said insulating cap for protection; and hermetically sealing the collective conductor in said waterproof agent in said insulating cap, whereby respiratory action is prevented;

wherein the step of welding and fixing precedes the step of injecting.

2. The method of claim 1, wherein the step of welding and fixing said insulating cap to at least one remaining portion of at least one insulating coating provides a gap between said insulating cap and other remaining portions, the waterproof agent being injected into said opening through said gap.

3. The method of claim 1, wherein the step of welding and fixing includes welding and fixing the insulating cap to remaining portions of the insulating coatings of all of said wires.

4. A connector comprising:

a plurality of wires having first portions including exposed conductors joined together to form a collective conductor and second portions including insulated wires;

an insulating cap having a first end and a second end, said first end having an opening and said second end being closed, wherein said first portions of said plurality of wires are disposed within said insulating cap and toward said second end, and at least one of said second portions of the wires is fixed to the first end of the insulating cap;

a conductor pocket located in the second end, said conductor pocket being adapted to receive said first portions of said wires;

a waterproof agent disposed within the insulating cap between said first and second ends and surrounding the first portions of the wires; and a hermetic seal that seals the collective conductor in the waterproof agent in the insulating cap, wherein the conductors are protected from water damage and respiratory action.

5. The connector of claim 4, wherein said insulating cap is tapered from said first end to said second end.

6. The connector of claim 4, wherein said first end of said insulating cap has a generally cylindrical shape and said second end is generally cone shaped.

7. The connector of claim 4, wherein the first end of the insulating cap includes a securing piece that extends outwardly from said first end and is adapted to be connected to at least one of said second portions of said wires.

8. The connector of claim 4, wherein only one of said second portions is fixed to the insulating cap.

9. A connector comprising:

a plurality of wires having first and second portions; the first portions including exposed conductors; the second portions including insulated wires; and an insulating cap comprising:

a first end and a second end, said first end having an opening and said second end being closed;

a securing piece that extends outwardly from said first end and is adapted to be connected to at least one of said second portions of said wires;

wherein said first portions of said plurality of wires are disposed within said insulating cap and toward said second end, and at least one of said second portions of the wires is fixed to the first end of the insulating cap.

10. A connector comprising:

a plurality of wires having first and second portions; the first portion including exposed conductors; the second portions including insulated wires; and an insulating cap comprising:

a first end and a second end, said first end having an opening and said second end being closed;

a conductor pocket located in the second end, said conductor pocket being adapted to receive said first portions of said wires;

wherein at least one of said first portions of said plurality of wires is disposed within said insulating cap at said second end of said insulating cap, and at least one of said second portions of the plurality of wires is fixed to the first end of the insulating cap.

11. The connector of claim 10, further comprising a waterproof agent disposed within the insulating cap between said first and second ends and surrounding the first portions of the plurality of wires.

12. The connector of claim 11, wherein the waterproof agent is injected into the insulating cap prior to fixing at least one of said second portions of the plurality of wires to the first end of the insulating cap.

* * * * *